United States Patent [19]

Hayasaki

[11] Patent Number: 4,930,313
[45] Date of Patent: Jun. 5, 1990

[54] AUTOMATIC TRANSMISSION PRESSURE-REGULATING VALVE WITH FILTERED FLOW TO OUTLET PRESSURE FEEDBACK CHAMBER

[75] Inventor: Koichi Hayasaki, Fujisawa, Japan

[73] Assignee: Nissan Motor Co., Ltd., Yokohama, Japan

[21] Appl. No.: 270,909

[22] Filed: Nov. 14, 1988

[51] Int. Cl.⁵ .................... B60K 41/16; F15B 21/04
[52] U.S. Cl. ...................................... 60/454; 91/446; 137/544; 137/549
[58] Field of Search ............... 137/544, 549, 550; 60/453, 454, 536; 91/446, 468

[56] References Cited

U.S. PATENT DOCUMENTS

| 3,863,739 | 2/1975 | Schaeffer et al. | 74/869 X |
| 4,730,521 | 3/1988 | Hayasaki et al. | 74/867 |

Primary Examiner—Robert E. Garrett
Assistant Examiner—George Kapsalas
Attorney, Agent, or Firm—Foley & Lardner, Schwartz, Jeffery, Schwaab, Mack, Blumenthal & Evans

[57] ABSTRACT

The feedback chamber of the pilot pressure valve is supplied with its discharge after it has been filtered whereby the pressure which is supplied to the feedback chamber is subject to the flow restricting effect of the strainer and increases the valve output to compensate for the flow restrictive nature of the strainer.

3 Claims, 2 Drawing Sheets

AUTOMATIC TRANSMISSION PRESSURE-REGULATING VALVE WITH FILTERED FLOW TO OUTLET PRESSURE FEEDBACK CHAMBER

BACKGROUND OF THE INVENTION

1. Field of the Invention

The present invention relates generally to a control system for an automatic transmission and more specifically to a pressure control arrangement which produces a constant pressure signal which signal is supplied to various valves in the form of a source pressure.

2. Description of the Prior Art

U.S. Pat. No. 4,730,521 issued on March 15, 1988 in the name of Hayasaki et al, discloses a transmission control arrangement which includes a shift shock suppression arrangement of the nature shown in FIG. 1. In this arrangement so called pilot pressure PP is produced by a pilot pressure valve 1 by using line pressure as a source pressure and modifying the same in order to form a pressure having a single constant level.

As shown in FIG. 1 this pilot valve 1 comprises a spring 2, and a spool 4. The spring 2 is arranged to bias the spool 4 in the bore 5 it is reciprocatively disposed in a direction wherein the volume of a feedback chamber 6 tends to be minimized.

The spool 4 is formed with two lands 4a, 4b while the bore is formed with five ports 5a–5e. When the spool 4 assumes the position shown by the upper sectional half, drain port 5d is completely closed and supply port 5b opened. Under these conditions line pressure PL (source pressure) is permitted to pass from conduit 8 via port 5b to port 5c and into pilot pressure conduit 10. As shown, conduit 10 is fluidly communicated with the feedback chamber 6 by way of a branch conduit 10a in which an orifice 12 is disposed. The pressure which develops in the feedback chamber 6 produces a bias which acts against the bias of the spring 2 and the spool 4 is moved back toward the position shown in the lower sectional half wherein supply port 5b tends to close and drain port 5d begins to open. Depending on the strength of the spring 2, the pilot pressure PP is modulated to a constant level due to an equilibrium being established between the opposed forces.

As shown, conduit 10 is arranged to communicate with a number of valves including a solenoid valve 14. This valve 14 is arranged to produce a control pressure PC by varying the duty cycle of the signal applied to the solenoid and therefore varying the amount of pressure which is arranged to be bled off downstream of an orifice 16. In this instance this pressure is arranged to vary with with load (i.e. define throttle pressure or a pressure signal which varies in accordance therewith).

This control pressure PC is supplied to a pressure modifier valve 18 along with the pilot pressure PP and is used to modify the level of the pilot pressure in a manner which generates a line pressure control signal which is supplied to the line pressure regulator valve 20.

However, in this arrangement an oil strainer or filter 22 which is designed to remove various small particles from the hydraulic fluid, is arranged in conduit 10 so as to be located in series in between the pilot valve 1 and the valves to which the pilot pressure PP supplied (e.g. solenoid valve 14) and thus prevent jamming and the like improper operation the same. This filter 22 is relatively small in size and therefore tends to increase the flow resistance of the circuit in which it is disposed.

This has been discovered to lead to the drawback that the level the pilot pressure PP downstream of the filter 22 undergoes a reduction. This effect increases as the amount of material which is filtered out accumulates and further increases the resistance of flow. Due to the lowering of the pilot pressure PP, as the duty cycle of the signal applied to the solenoid valve 14 is derived assuming that the pilot pressure will assume a predetermined level, the lowering of the pilot pressure PP leads to the situation wherein the throttle pressure (PC) is also lowered. This effects the level of the pressure signal which is fed to the line pressure regulator valve and thus has a detrimental effect on the control of this pressure also.

For a more complete disclosure of the above arrangement refernence may be had to the above mentioned U.S. Pat. No. 4,730,521 the disclosure of which is hereby incorporated by reference thereto.

SUMMARY OF THE INVENTION

It is an object of the present invention to provide an arrangement which allows for the provision of a small filter in the pilot pressure circuit and which obviates any reduction in pilot pressure due to the flow restrictive properties of the filter.

In brief, the above object is achieved by an arrangement wherein the feedback chamber of the pilot pressure valve is supplied with its discharge after it has been filtered and thus ensures that the pressure which is supplied to the feedback chamber is subject to the flow restricting effect of the strainer. This increases the valve output to compensate for the flow restrictive characteristics of the strainer.

More specfically, the present invention is deemed to comprise a transmission which features: a source of hydraulic fluid under pressure; a first valve, said first valve being in fluid communication with said source and so constructed and arranged as to modify the supply of hydraulic fluid under pressure to form an essentially constant level pressure, said first valve including a spool valve element which controls the fluid communication between a supply port in fluid communication with said source, and a discharge port; a filter, said filter being arranged to remove particles contained in the fluid discharged from said discharge port; means defining a feedback chamber in said valve, said spool valve element having a portion exposed to said feedback chamber, said feedback chamber being fluidly communicated with said discharge port by way of said filter in a manner wherein the pressure which supplied into said feedback chamber from said discharge port is subject to the flow restricting properties of said filter.

DETAILED DESCRIPTION OF THE PRESENT INVENTION

Figure 1:
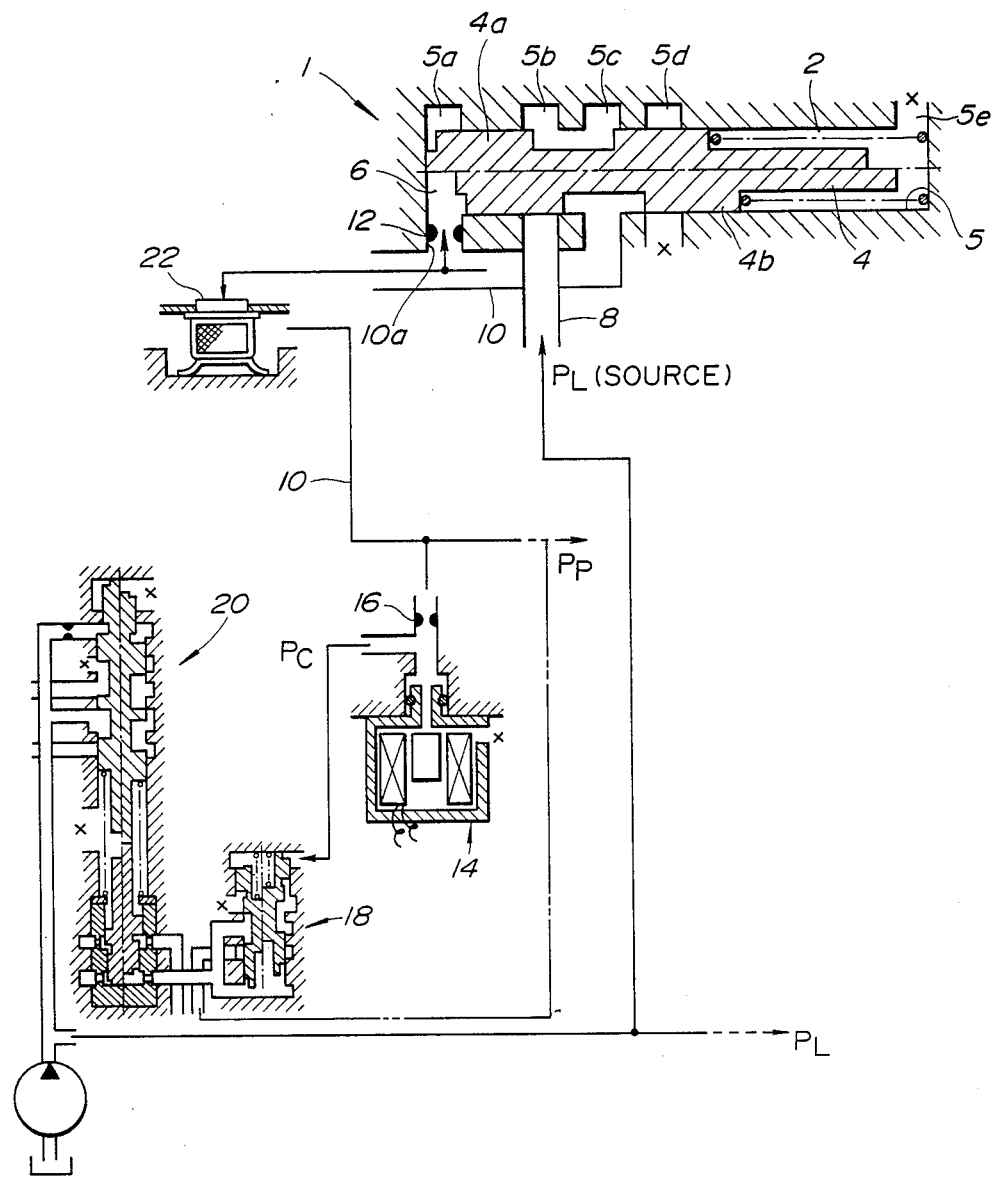
FIG. 1 is a schematic sectional elevation showing prior art arrangement discussed hereinabove.
Figure 2:
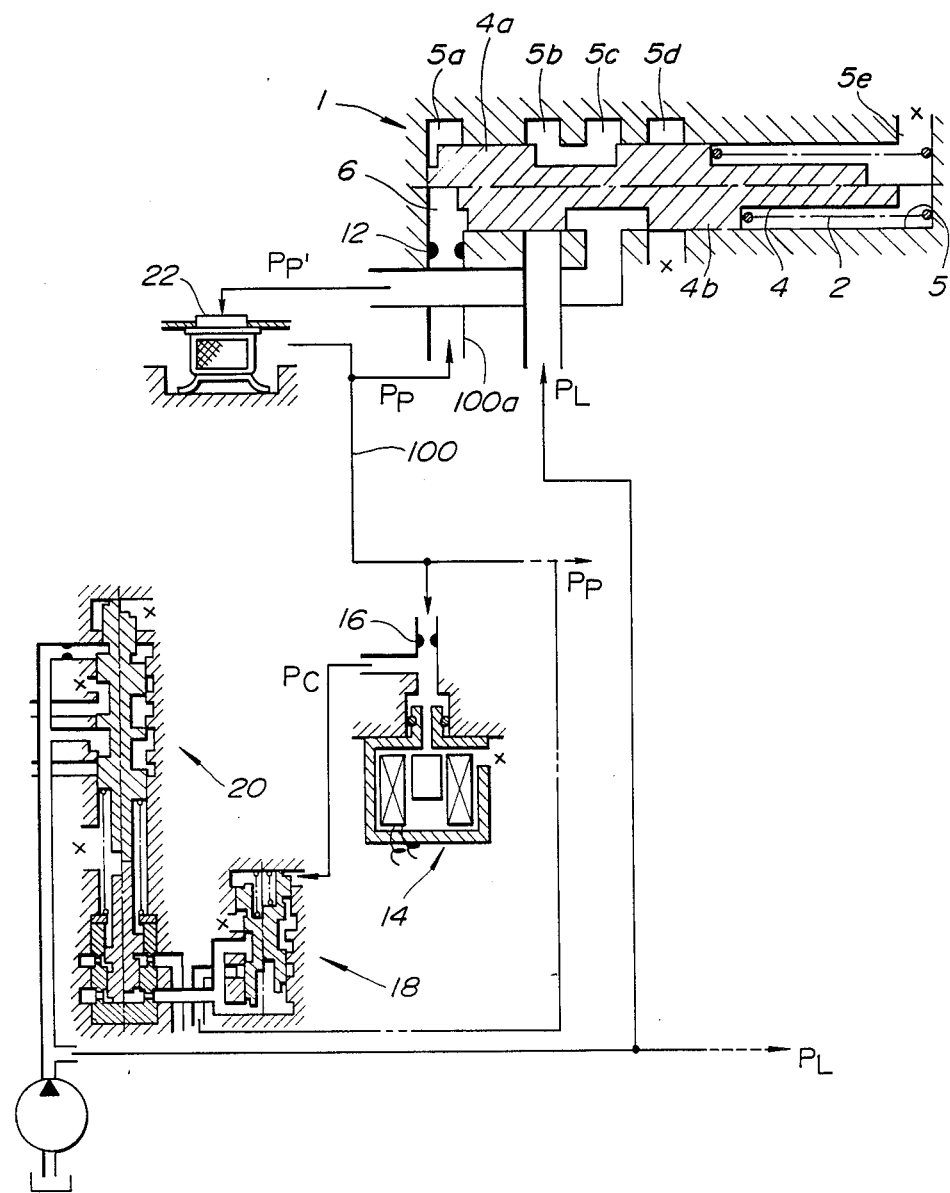
FIG. 2 is a schematic sectional elevation of an embodiment of the present invention.

FIG. 2 shows an embodiment of the present invention. In this arrangement, which is basically similar to the arrangement shown in FIG. 1, like elements are denoted by like numerals. As shown, the conduit arrangement 10 is replaced with a modified arrangement 100 wherein the branch conduit 100a is arranged to communicate with the conduit 100 at a location downstream of the filter 22. With this arrangement, as the pressure PP which is actually supplied to the various valves of the system is fed into the feedback chamber 6 and the situation is induced wherein the pressure PP' which develops between port 5c and the filter 22 is actually increased to the point of compensating for the flow resistance of the filter 22. Even when the resistance increases with the accumulation of debris in said device, the arrangement compensates by increasing the level of pressure PP' in manner wherein pressure PP remains exactly at the desired level.

With the illustrated embodiment, as the level of the pilot pressure PP is maintained accurately at the appropriate level, the levels of the control pressure PC (throttle pressure) and the line pressure PL are increased to their appropriate levels and undesirable slippage and the like of the various friction elements due to a reduced line pressure level is prevented.

As the attendant operation and advantages will be abundantly clear to those skilled in the art to which the present invention pertains, no further discussion will be given for brevity.

What is claimed is:

1. In a transmission
a source of hydraulic fluid under pressure;
a first valve, said first valve being in fluid communication with said source and so constructed and arranged as to modify the supply of hydraulic fluid under pressure to form an essentially constant level pressure, said first valve including a spool valve element which controls the fluid communication between a supply port in fluid communication with said source, and a discharge port;
a filter, said filter being arranged to remove particles contained in the fluid discharged from said discharge port;
means defining a feedback chamber in said valve, said spool valve element having a portion exposed to said feedback chamber, said feedback chamber being fluidly communicated with said discharge port by way of said filter in a manner wherein the pressure which is supplied into said feedback chamber from said discharge port is subject to the flow restricting properties of said filter.

2. A transmission as claimed in claim 1 wherein said source of hydraulic fluid under pressure comprises:
a pump; and
a line pressure regulator valve, said line pressure regulator valve being arranged to modify the output of said pump in a manner to define a line pressure.

3. A transmission as claimed in claim 2 further comprising second and third valves, said second valve being arranged to communicate with said feedback chamber and to modify the pressure supplied thereto from said first valve in a manner to form a first control signal which is supplied to said third valve, said third valve being arranged to be responsive to said first control signal and to be fluidly communicated with said feedback chamber in a manner to modify the pressure supplied from said first valve to form a second control signal, said second control signal being supplied to said line pressure control valve and used to vary the level of said line pressure.

* * * * *